T. H. EICKHOFF AND AND C. A. TUNKS.
HEADSPACE MICROMETER.
APPLICATION FILED JULY 25, 1917.

1,351,721.

Patented Aug. 31, 1920.
3 SHEETS—SHEET 1.

Inventor
Theodore H. Eickhoff
Charles A. Tunks

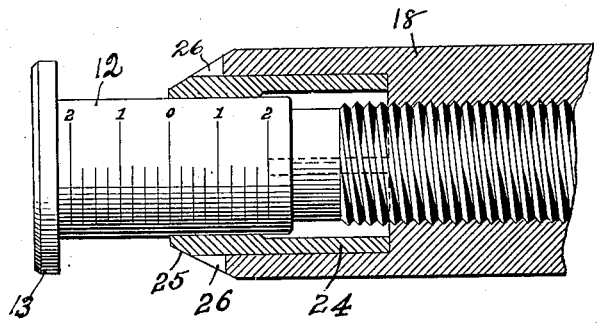
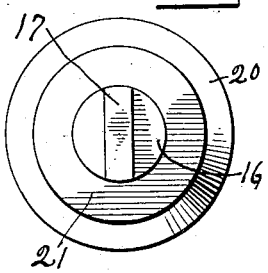
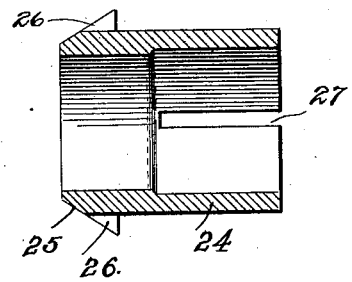
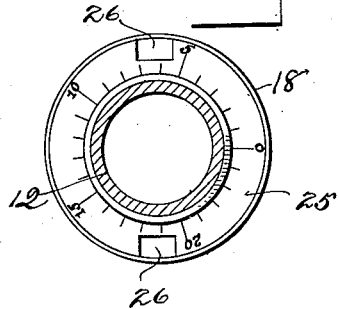
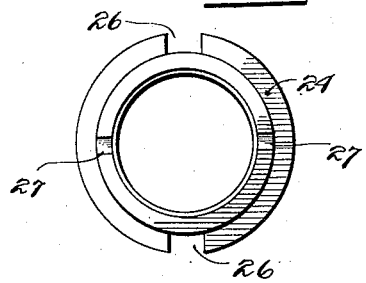

T. H. EICKHOFF AND AND C. A. TUNKS.
HEADSPACE MICROMETER.
APPLICATION FILED JULY 25, 1917.
1,351,721.  Patented Aug. 31, 1920.
3 SHEETS—SHEET 3.
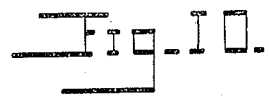
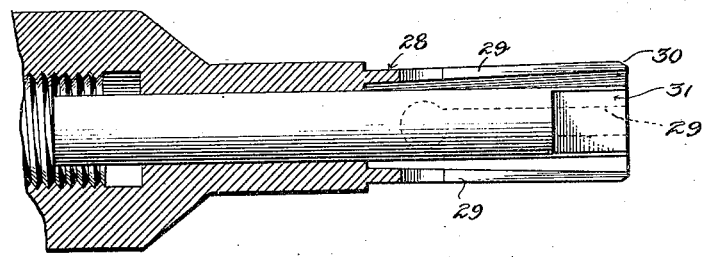
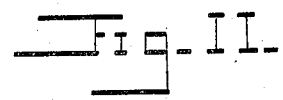
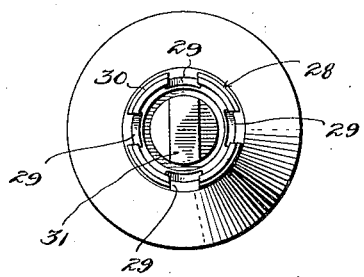
Witnesses
Inventor
Theodore H. Eickhoff
Charles A. Tunks.
By Roberts, Roberts + Cashman
Attorney

UNITED STATES PATENT OFFICE.

THEODORE H. EICKHOFF, OF WASHINGTON, DISTRICT OF COLUMBIA, AND CHARLES A. TUNKS, OF CLEVELAND, OHIO, ASSIGNORS, BY DIRECT AND MESNE ASSIGNMENTS, TO AUTO-ORDNANCE CORPORATION, OF NEW YORK, N. Y., A CORPORATION OF NEW YORK.

HEADSPACE-MICROMETER.

1,351,721.  Specification of Letters Patent.  Patented Aug. 31, 1920.

Application filed July 25, 1917. Serial No. 182,761.

*To all whom it may concern:*

Be it known that we, THEODORE H. EICKHOFF and CHARLES A. TUNKS, citizens of the United States, residing at Washington, in the District of Columbia, and Cleveland, in the county of Cuyahoga and State of Ohio, respectively, have invented certain new and useful Improvements in Headspace-Micrometers, of which the following is a specification.

The invention relates to micrometers, and more particularly is designed for making interior measurements, and its special purpose, as herein disclosed, is for gaging the chamber of a gun so as to determine the headspace of such chamber.

The construction is such that this measurement may be conveniently and accurately taken with the bolt mechanism closed, so that the dimension of the chamber under actual firing conditions will be properly determined.

We have shown the invention in connection with the ordinary army rifle, but it will be understood that its use is not limited to this or any particular type of gun, as it is adaptable to any gun using fixed ammunition, whether it be of the small arm or ordnance type, in which it is necessary to determine the headspace of the cartridge chamber.

In the drawings herewith:

Fig. 5 is a view in section showing a slightly modified construction;

Fig. 6 is a view in end elevation of the gage looking from the right, Fig. 3.

Fig. 7 is a sectional view of the adjusting sleeve for the micrometer shown in Fig. 5.

Fig. 8 is a view in end elevation of the sleeve shown in Fig. 5.

Fig. 9 is an end view of the adjusting ring or collar, looking from the right, Fig. 7.

Fig. 10 is a view of so much of the beam and body mechanism as will illustrate a modified form in which gripping means are provided for preventing rotation of the body or sleeve.

Fig. 11 is an end view looking from the right, Fig. 10.

Figure 1:
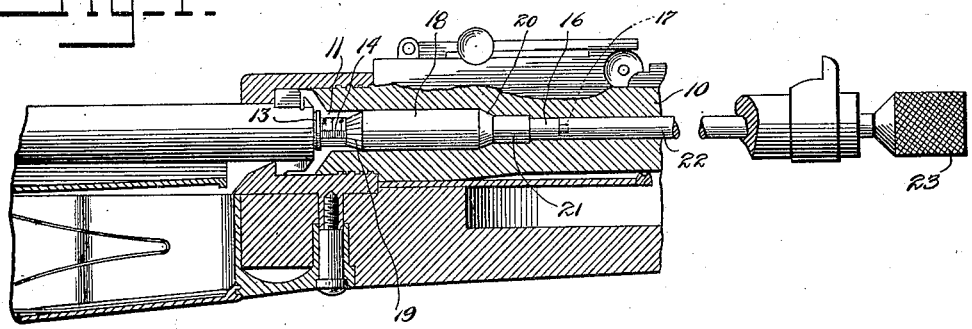
Figure 1 is a longitudinal sectional view taken vertically through so much of a rifle as is necessary to illustrate the use of our invention, the micrometer being shown in the cartridge chamber.

Referring to the drawings by numbers, like numbers indicating like parts in the several views, 10 denotes a rifle barrel mounted in the usual manner, or any suitable manner, on the stock (conventionally shown in Fig. 1), said rifle barrel being provided with a cartridge chamber 11 of the usual or any selected type, the customary breech closure or bolt being provided to function in the usual manner.

It is customary before giving the finishing cut to a cartridge chamber 11, to determine the headspace of that chamber accurately, in order that when the final finishing cut is made, the chamber may be accurately machined to the proper dimensions and uniform headspace secured for the fixed ammunition used.

The determination of headspace of the chamber is a matter which requires very accurate measurements, and being an inside measurement and not readily accessible, it is a matter which has required, so far as we are advised, under present methods considerable time and effort.

The micrometer comprises a beam 12 provided with a measuring disk 13 at one end, a graduated section 14, a measuring thread section 15, and a cylindrical extension 16 having at its extreme end preferably a squared or other tip 17 angular in cross-section. The graduated section 14 will be laid off in any usual or desired manner, the graduations being conventionally shown in the present disclosure.

Figure 2:
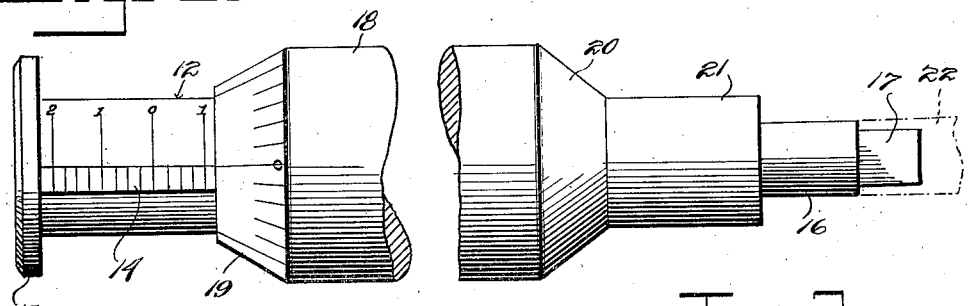
Fig. 2 is a view in side elevation of the micrometer.
Figure 3:
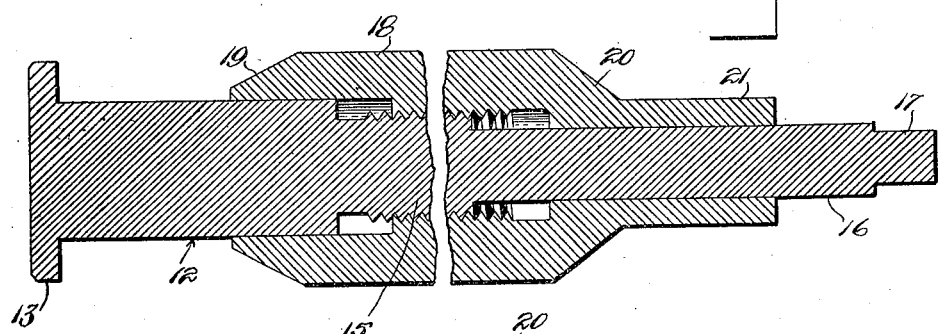
Fig. 3 is a longitudinal sectional view of the micrometer shown in Fig. 2.
Figure 4:
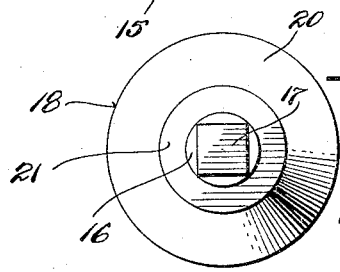
Fig. 4 is an end elevational view looking from the right, Fig. 2.

Mounted on said beam and in engagement with the measuring thread section 15 thereof, is a measuring sleeve 18, one end of which is preferably beveled as at 19, and provided with graduations, as shown in Fig. 2, the graduations on the beveled end 19 acting in conjunction with the graduations on the section 14 on the beam.

The sleeve 18 has an outer diameter and contour of substantially the diameter and contour of the ammunition used in the particular gun, the headspace of whose chamber is to be determined, being provided in the present instance with a shoulder 20 corresponding to the shoulder provided on the ordinary rifle cartridge, the said shoulder 20 serving as an abutment which strikes against the shoulder at the forward end of the cartridge chamber, and the forward end of the sleeve is in the form of a cylindrical extension 21 fitting the bore of the gun.

The micrometer as thus described will be set for zero (0) and inserted in the cartridge chamber, its normal length when set for zero (in the example shown here) being 2.4975. The measurement of that chamber, whose variation from normal dimensions is to be determined, will then be made by rotating the beam and sleeve relative to each other, so as to lay off on the graduated scale such variation, if any exists. Rotation of the beam and sleeve relative to each other will be accomplished by means of a rod 22 which is introduced from the muzzle of the barrel of the gun, and has a complementary engaging end to engage the squared or angular tip 17 on the beam, and while this engaging means is a convenient and suitable one, it is to be understood that any means of engaging the rod and beam to effect rotation may be adopted. The end of the rod 22 is preferably provided with a knurled finger-piece 23 by means of which it may be conveniently turned. Rotation of the rod 22 will, of course, rotate the beam, and through the measuring threads thereon which engage the corresponding interior threads of the sleeve 18, causing a longitudinal travel of the beam and sleeve relative to each other, the frictional engagement of the sleeve 18 with the cartridge chamber being sufficient to prevent any rotation of the sleeve. When the beam and sleeve have been rotated until the shoulder 20 fits snugly the forward shouldered end of the cartridge chamber, and the disk 13 abuts against the firing bolt, the measurement will have been taken, and the rod 22 will then be withdrawn, after which the micrometer will be removed from the cartridge chamber, and the reading taken to show any variation which must be taken care of in the final finishing cut.

In that form of the invention shown in Figs. 5, 6, 7, 8, and 9, the construction is generally the same as that just described, except that provision is made for correcting the micrometer if, by reason of wear, it is inaccurate. This adjustment and compensation for wear is secured by providing the sleeve 18 with an adjustable collar or ring 24, which, as shown in Fig. 5, is seated in a recess in the sleeve, and is beveled at 25, as shown, the bevel of the sleeve carrying the graduations instead of forming them, as in the other type on the beveled end of the sleeve itself. The ring 24 has a close frictional fit in the recess of the sleeve so that it will not turn under ordinary conditions, but is provided with spanner notches 26, by means of which it may be moved for purposes of adjustment, and preferably, the reduced portion of the ring or collar 24 which seats in the recess, is provided with slots 27, so as to give a spring-gripping action between the collar and the recess of the sleeve, in which it is seated. With this construction, variation due to wear can be readily compensated for. As stated above, the normal length of the headspace micrometer when the reading is zero (0) is, in this particular disclosure, 2.4975, and in order to set the headspace micrometer, it will be placed in a regular micrometer, set for the proper dimension, and the beam will then be projected until there is a close fitting of beam and sleeve in the standard micrometer. The ring 24 will then be rotated by a suitable tool to bring the zero mark to proper position and alinement, and any inaccuracies due to wear will have been taken care of.

While, as stated above, the friction of the body-piece or sleeve of the micrometer is generally sufficient to prevent rotation of that sleeve, when the beam is rotated, to effect the adjustment of the movable parts, it may be desirable to provide locking means which will hold the body or sleeve of the micrometer fixedly so that there is no possibility of its rotating as the instrument is manipulated.

A convenient and efficient means of securing this locking of the body or sleeve is shown in Figs. 10 and 11. In the form of the invention there shown, an extension 28 is provided which fits the bore of the gun in front of the cartridge chamber, the said extension 28 slotted as at 29, sprung to a diameter slightly larger than the diameter of the barrel, and then set so that a series of spring fingers or projections are provided which will take firm locking grip on the inner wall of the bore when the micrometer is forced into the cartridge chamber. The front of the extension 28 is beveled as at 30 so that it may be forced into the bore, readily compressing the spring fingers as it is pushed to its seat.

Preferably, this spring finger projection will be internally bored or chambered as shown, and the end beam 31, which is to be engaged by the detachable tool, will lie within the spring finger projection, as illustrated in Fig. 10.

It will be understood that such variations from the constructions shown as mechanical skill and expedience may dictate may be made without departing from the spirit of the invention.

We claim:

1. A headspace micrometer for measuring the length of the firing chamber in a firearm comprising a beam adapted to be placed in the firing chamber, and a sleeve movable longitudinally of the beam and adapted to be placed in the firing chamber, the sleeve and the beam having measuring faces respectively adapted to engage the forward and rearward ends of the firing chamber when the firing chamber is closed, and means adapted to extend through the barrel of the firearm for moving the sleeve and beam longitudinally of each other when the firing chamber is closed.

2. A headspace micrometer for measuring the distance between the forward end of the firing chamber of a firearm and the forward end of the breech closure when closed comprising a beam and a sleeve threaded on the beam to move longitudinally thereof, the beam and sleeve having measuring surfaces facing in opposite directions along the beam which faces are adapted to engage said ends of the firing chamber and breech closure respectively, and said beam having a portion extending into the barrel of the firearm by means of which the beam may be rotated from the muzzle end of the barrel after the breech closure has been closed to bring said surfaces into engagement with said ends.

3. A headspace micrometer for measuring the length of the firing chamber of a firearm when the breech closure is in closed position comprising two parts adapted to be placed in the firing chamber, the two parts being relatively adjustable longitudinally of the firing chamber and having surfaces facing in opposite directions which surfaces are adapted to engage the opposite ends of the firing chamber, and a third part adapted to be inserted through the barrel of the firearm into engagement with one of said parts to effect relative adjustment of said first two parts longitudinally of the firing chamber.

4. A headspace micrometer for measuring the distance from the forward tapered end of a firing chamber to the forward end of the breech closure when closed comprising a beam adapted to be placed in the firing chamber and a sleeve surrounding said beam, the beam and sleeve being longitudinally movable relative to each other and having registering micrometer calibrations, the rear end of the beam being flat to butt against said end of the breech closure and the forward end of the sleeve being tapered to fit said tapered end of the firing chamber.

5. A headspace micrometer for measuring the length of the firing chamber in a firearm comprising a beam adapted to be placed in the firing chamber, and a sleeve threaded on the beam and adapted to be placed in the firing chamber, said sleeve having substantially the contour of the firing chamber and the beam and the sleeve having measuring faces adapted to engage the forward and rearward ends of the firing chamber when the firing chamber is closed, and means adapted to extend through the barrel of the firearm for rotating the beam and sleeve relatively to each other to bring said faces into engagement with said ends.

6. A device for measuring the internal dimension of a chamber which is closed except for an opening in one side comprising a beam adapted to extend longitudinally into said opening, a sleeve threaded on said beam, said beam and sleeve having measuring faces directed away from each other lengthwise of said beam which are adapted to engage the opposite sides of said chamber, said beam being rotatable by means of the portion thereof extending outwardly into said opening, and said sleeve having yielding friction means adapted to engage the wall of said chamber for preventing rotation thereof with said beam.

7. A device for measuring the distance between the forward end of the firing chamber of the firearm and the forward end of the breech closure when closed comprising a beam and sleeve threaded on the beam to move longitudinally thereof, the beam and sleeve having measuring surfaces facing in opposite directions along the beam which are adapted to engage said ends of the firing chamber and breech closure respectively, means for rotating said beam while the breech closure is closed to bring said surfaces into engagement with said ends, and said sleeve having a portion extending into the barrel of the firearm with a snug fit to prevent the sleeve from rotating with the beam.

In testimony whereof, we have hereunto set our hands.

THEODORE H. EICKHOFF.
CHARLES A. TUNKS.